(12) United States Patent
Patrizi et al.

(10) Patent No.: US 7,188,897 B2
(45) Date of Patent: Mar. 13, 2007

(54) INFANT CARRIER WITH ADJUSTABLE HARNESS SYSTEM

(75) Inventors: Timothy Patrizi, Reading, PA (US); Charles E. Crane, Coatesville, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 11/079,516

(22) Filed: Mar. 15, 2005

(65) Prior Publication Data
US 2006/0220427 A1 Oct. 5, 2006

(51) Int. Cl.
*A47C 1/08* (2006.01)
(52) U.S. Cl. .................. 297/250.1; 297/468; 297/467; 297/483; 297/256.15
(58) Field of Classification Search ............. 297/250.1, 297/468, 483, 484, 256.15, 467, 469; 24/198, 24/200
See application file for complete search history.

(56) References Cited

U.S. PATENT DOCUMENTS

| | | | |
|---|---|---|---|
| 3,910,634 A | | 10/1975 | Morris |
| 4,402,548 A | * | 9/1983 | Mason ........................ 297/464 |
| 5,082,325 A | * | 1/1992 | Sedlack ...................... 297/468 |
| 6,030,047 A | * | 2/2000 | Kain ........................... 297/484 |
| 6,457,774 B2 | * | 10/2002 | Baloga ..................... 297/250.1 |
| 6,471,298 B2 | * | 10/2002 | Carine et al. ................ 297/483 |
| 6,543,847 B2 | * | 4/2003 | Balensiefer .............. 297/250.1 |
| 6,619,753 B2 | * | 9/2003 | Takayama ................... 297/484 |
| 6,688,685 B2 | * | 2/2004 | Kain ........................ 297/250.1 |
| 6,698,841 B1 | * | 3/2004 | Glover et al. ................ 297/484 |
| 2002/0195867 A1 | | 12/2002 | Barger et al. |
| 2003/0071511 A1 | | 4/2003 | Stafford et al. |

FOREIGN PATENT DOCUMENTS

| EP | 094 211 | 11/1983 |
|---|---|---|
| JP | 2001206114 | 7/2001 |

OTHER PUBLICATIONS

Graco® Infant Restraint/Carrier Owner's Manual, pp. 1-45, Graco Children's Products Inc., 2003.
European Search Report issued in counterpart EP application No. 06251382.5 dated Jul. 24, 2006.

* cited by examiner

*Primary Examiner*—Laurie K. Cranmer
(74) *Attorney, Agent, or Firm*—Lempia Forman LLC

(57) ABSTRACT

An infant carrier includes a carrier shell including a seating area for a child; and a harness system adapted to connect to the carrier shell and adapted to be adjusted between a first configuration for a smaller child and a second configuration for a larger child. The harness system includes first and second straps, each of the first and second straps having a shoulder strap end and a lap strap end, a shoulder strap adjuster associated with the shoulder strap ends of each of the first and second straps to enable adjustment of the shoulder strap ends between the first configuration and the second configuration, and a lap strap adjuster associated with the lap strap ends of each of the first and second straps to enable adjustment of the lap strap ends between the first configuration and the second configuration.

36 Claims, 10 Drawing Sheets

INFANT CARRIER WITH ADJUSTABLE HARNESS SYSTEM

FIELD OF THE INVENTION

This invention relates to an infant carrier with an adjustable harness system. More specifically, this invention relates to an infant carrier with an adjustable harness system that can accommodate a relatively large child.

BACKGROUND OF THE INVENTION

Infant car seats typically include a base and an infant carrier that can attach to and be detached from the base. The base can remain in the vehicle, secured to the vehicle seat by a latch system or by the vehicle belt system, and the infant carrier can be removed from the base to transport the child. Infant car seats in the market today are popular because of the convenience they offer to parents. For example, the infant carrier allows the parent to carry a sleeping child from car to home or other destination without disturbing the child. The infant carrier also can be snapped onto a stroller to make a travel system.

Despite the many benefits of infant car seats, the usage of infant carriers generally is limited only to the infant's first six to eight months of life. Most infant carriers are rated by manufacturers for use from birth to 22 pounds. The infant carriers also are rated for use by children only up to a certain height. Infants younger than one year may outgrow rated weight and height limits established by manufacturers. Parents see first signs of this outgrowth when they notice that the child's legs and feet extend past the car seat and kick against the vehicle seat back. Parents perceive that this outgrowth makes the child uncomfortable.

Efforts are being made to increase the weight and height capability of infant carriers. One consideration in these efforts is that the harness system for the infant carrier must be able to secure a larger child in the infant carrier.

Thus, there is a need for a harness system for an infant car seat that can accommodate a larger child than can fit in a conventional infant car seat.

SUMMARY OF THE INVENTION

An aspect of the present invention relates to an infant carrier that includes a carrier shell and a harness system. The carrier shell includes a first set of shoulder strap slots, a second set of corresponding shoulder strap slots laterally spaced from the first set of shoulder strap slots, and first and second lap strap slots. The harness system is adapted to be connected to the carrier shell and adapted to be adjustable between a first configuration for a smaller child and a second configuration for a larger child. The harness system includes a first strap adapted to be threaded through one of the shoulder strap slots and the first lap strap slot, a second strap adapted to be threaded through one of the corresponding shoulder strap slots and the second lap strap slot, wherein each of the first and second straps includes a shoulder strap end having first and second looped portions and a lap strap end having first and second looped portions, a junction clip to couple the first and second straps together, the junction clip being receivable in the first looped portions of the first and second shoulder strap ends in the first configuration, the junction clip being receivable in the second looped portions of the first and second shoulder strap ends in the second configuration, a first lap strap clip being receivable in the first looped portion of the first lap strap in the first configuration and being receivable in the second looped portion of the first lap strap in the second configuration, and a second lap strap clip being receivable in the first looped portion of the second lap strap in the first configuration and being receivable in the second looped portion of the second lap strap in the second configuration.

Another aspect of the invention relates to an infant carrier that includes a carrier shell including a seating area for a child; and a harness system adapted to connect to the carrier shell and adapted to be adjusted between a first configuration for a smaller child and a second configuration for a larger child. The harness system includes first and second straps, each of the first and second straps having a shoulder strap end and a lap strap end, a shoulder strap adjuster associated with the shoulder strap ends of each of the first and second straps to enable adjustment of the shoulder strap ends between the first configuration and the second configuration, and a lap strap adjuster associated with the lap strap ends of each of the first and second straps to enable adjustment of the lap strap ends between the first configuration and the second configuration.

Another aspect of the invention relates to an infant carrier that includes a carrier shell including first and second lap strap slots; and a harness system adapted to be connected to the carrier shell and adapted to be adjustable between a first configuration for a smaller child and a second configuration for a larger child. The harness system includes a first strap adapted to be threaded through the first lap strap slot, a second strap adapted to be threaded through the second lap strap slot, wherein each of the first and second straps includes a lap strap end having first and second looped portions, a first lap strap clip being receivable in the first looped portion of the first lap strap in the first configuration and being receivable in the second looped portion of the first lap strap in the second configuration, and a second lap strap clip being receivable in the first looped portion of the second lap strap in the first configuration and being receivable in the second looped portion of the second lap strap in the second configuration.

Another aspect of the invention relates to an infant carrier that includes a carrier shell and a harness system. The carrier shell includes first and second lap strap slots and first and second adjuster slots. The harness system is adapted to be connected to the carrier shell and is adapted to be adjusted between a first configuration for a smaller child and a second configuration for a larger child. The harness system includes a first strap adapted to be threaded through the first lap strap slot and through the first adjuster slot, the first strap having a first lap strap end, and a second strap adapted to be threaded through the second lap strap slot and the second adjuster slot, the second strap having a second lap strap end, first and second lap strap clips associated with the first and second lap strap ends, respectively, wherein, in the first configuration, the first and second lap strap ends can be threaded through both the respective lap strap slot and the respective adjuster slot and secured at the respective adjuster slot by the respective lap strap clip, and, wherein, in the second configuration, the first and second lap strap ends can be threaded through the respective lap strap slot only and secured at the respective lap strap slot by the respective lap strap clip.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 11–12 are schematics illustrating an alternative lap strap adjuster, in which FIG. 12 illustrates lap strap ends in a first configuration suitable for a smaller child, and FIG. 11 illustrates a lap strap end in a second configuration suitable for a larger child.

DETAILED DESCRIPTION OF THE PREFERRED EMBODIMENTS

Reference will now be made in detail to presently preferred embodiments of the invention, examples of which are illustrated in the accompanying drawings. An effort has been made to use the same reference numbers throughout the drawings to refer to the same or like parts.

FIGS. 1–7 illustrate an infant carrier 10 including a harness system 100 according to an embodiment of the invention. The harness system 100 is designed enable a caregiver to secure a relatively large child in the infant carrier 10, such as a child weighing up to 30 pounds, as compared to conventional harness systems typically designed to secure children up to 22 pounds. The harness system 100 provides increased strap length without compromising the ability of the straps to be repeatedly adjusted as occurs, for example, when the child is taken out of the infant carrier, which generally requires loosening of the straps, and when the child is placed in the infant carrier, which generally requires tightening of the straps. In this regard, the harness system 100 provides a longer strap length than conventional harness systems and includes features to store the extra strap length and also to deploy the extra strap length when the child's size warrants.

Figure 1:
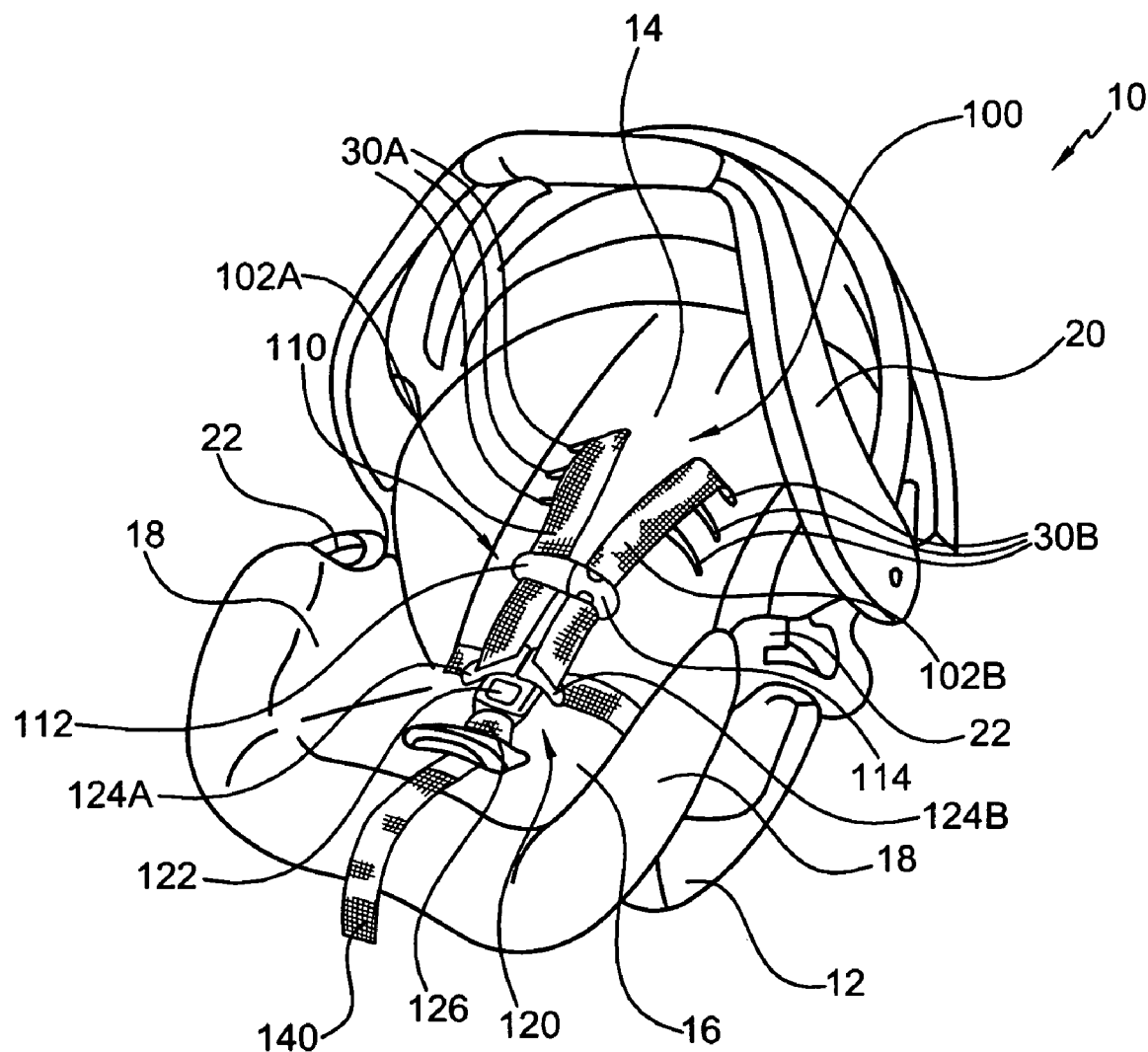
FIG. 1 is a front perspective view of an infant carrier including a harness system.
Figure 2:
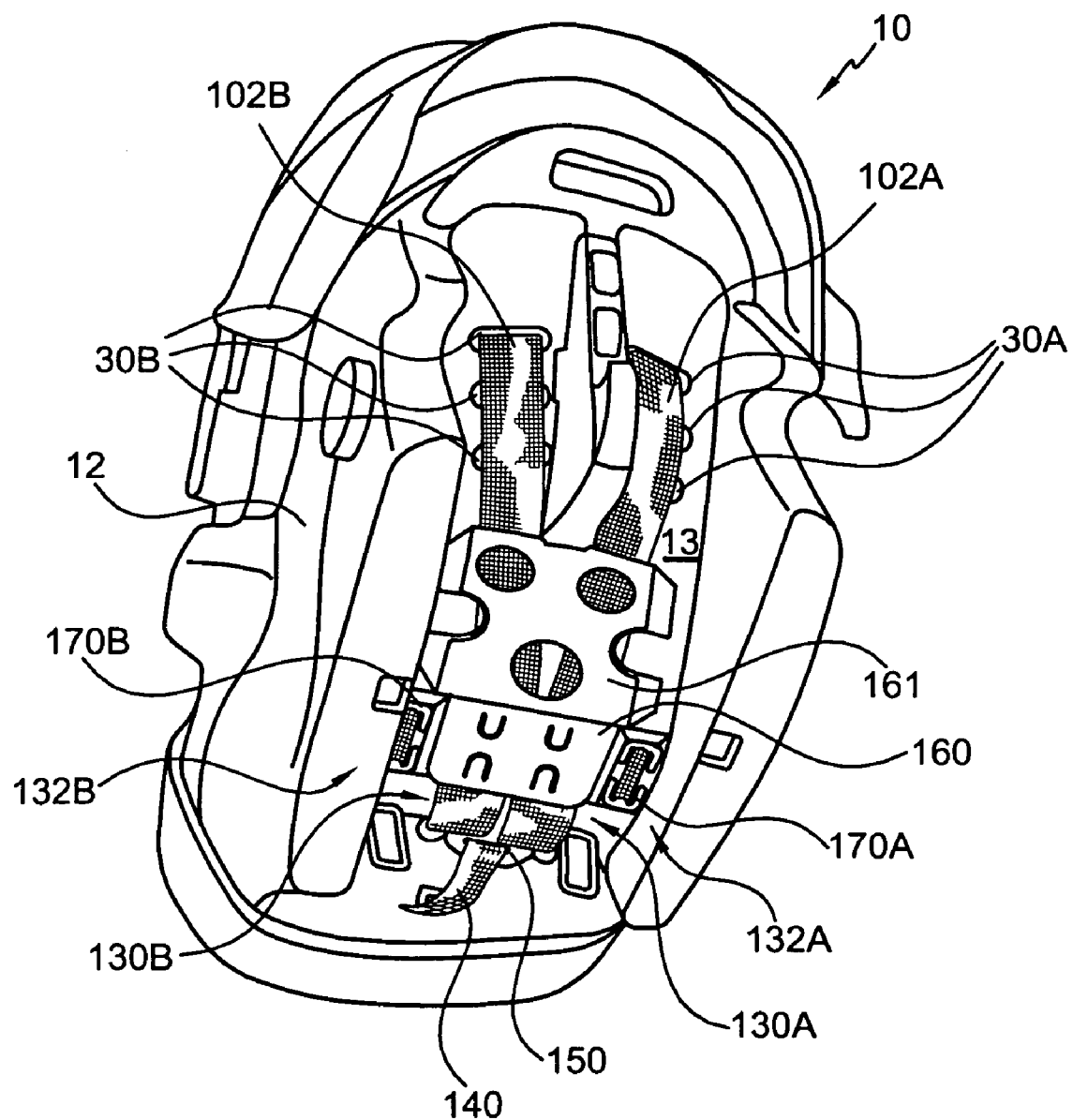
FIG. 2 is a rear perspective view of the infant carrier and the harness system.

FIGS. 1 and 2 illustrate an infant carrier 10 equipped with straps of webbing that form a five-point harness system 100 to secure a child in the infant carrier 10. The infant carrier 10 generally includes a shell 12 and soft goods that substantially cover an upper surface (hidden by the soft goods) of the shell 12 to provide a comfortable seating area for the child. The shell 12 also has a lower surface 13 that is contoured to rest on a support surface or to detachably couple to a base of an infant car seat. The upper surface of the infant carrier 10 (that is, the shell 12 and soft goods) generally includes a seat back 14, a seat bottom 16, and sidewalls 18 to define the seating area. The infant carrier 10 can include a handle 20 to facilitate transport of the infant carrier 10. Seat belt guides 22 can be formed in the shell 12 of the infant carrier 10 to create a belt pathway across the infant carrier 10 to enable a caregiver to secure the infant carrier 10 directly to a vehicle seat, such as an airplane seat.

Figure 8:
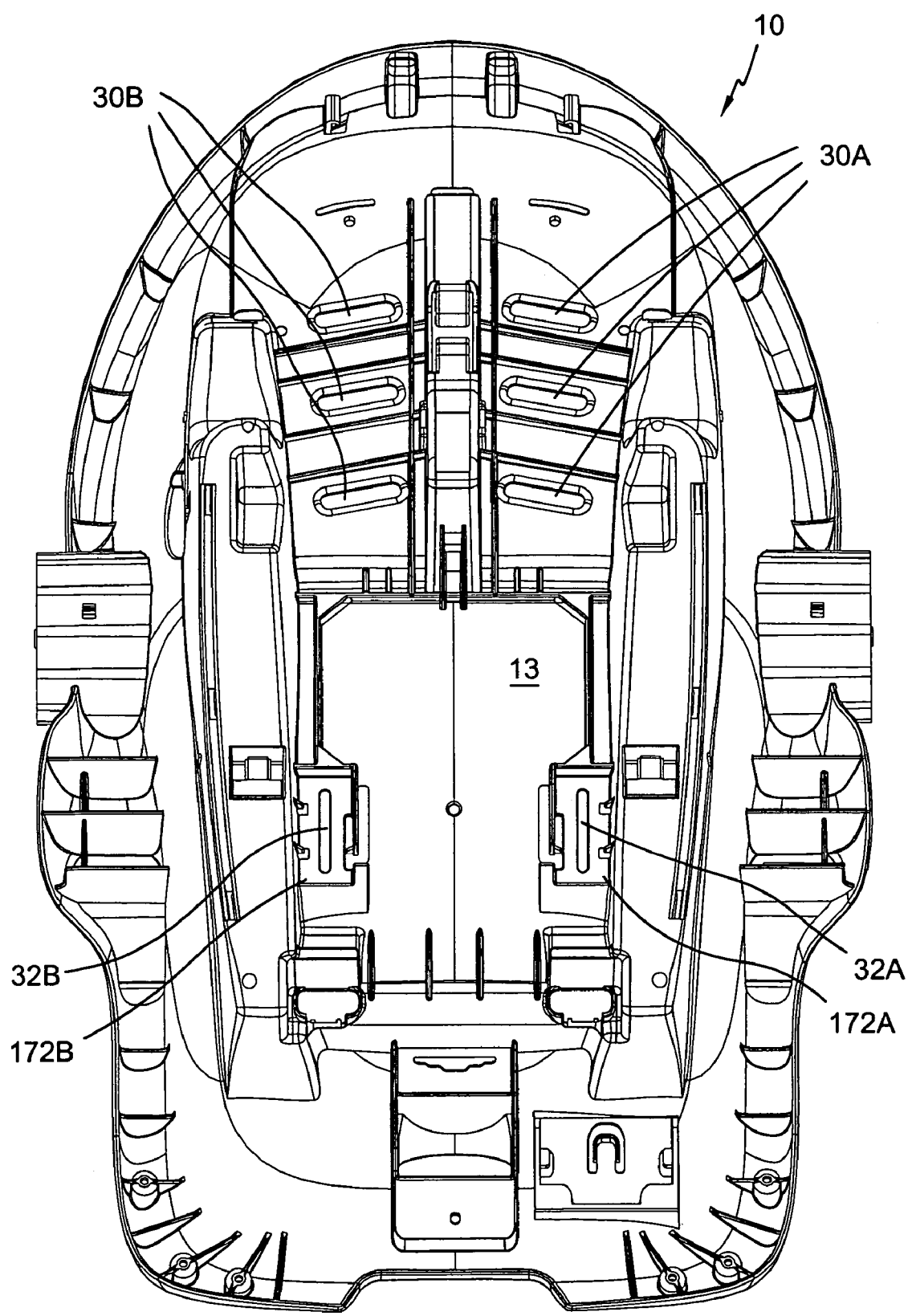
FIG. 8 is a bottom plan view of the infant carrier and illustrates the location of the lap strap slots.

The harness system 100 of the infant carrier 10 is adjustable between a first configuration to accommodate a smaller child, such as a newborn, for example, a newborn up to 10 pounds, and a second configuration to accommodate a larger child, such as a child weighing above 18 pounds. The harness system 100 generally includes first and second straps 102A, 102B that are adapted to be threaded through slots in the carrier shell 12 and soft goods. In this regard, the carrier shell 12 and soft goods can include a first set of shoulder strap slots 30A, a second set of corresponding shoulder strap slots 30B laterally spaced from the first set of shoulder strap slots 30A, and first and second lap strap slots 32A, 32B (seen best in FIG. 8). The lap strap slots 32A, 32B can be positioned in or near the seat bight area of the infant carrier 10, which is the area where the seat back 14 and the seat bottom 16 of the infant carrier 10 meet.

The first strap 102A is adapted to be threaded through one of the shoulder strap slots 30A and the first lap strap slot 32A, and a second strap 102B is adapted to be threaded through one of the corresponding shoulder strap slots 30B and the second lap strap slot 32B. The first and second straps 102A, 102B can be positioned in any of the shoulder strap slots 30A, 30B, depending on the height of the child. Each of the first and second straps 102A, 102B includes a shoulder strap end 130A, 130B, and each includes a lap strap end 132A, 132B. When the straps 102A, 102B are threaded through the appropriate slots, the shoulder strap ends 130A, 130B and the lap strap ends 132A, 132B are located at a lower surface of the infant carrier, as can be seen in FIG. 2.

The harness system 100 of the infant carrier includes a shoulder strap adjuster associated with the shoulder strap ends 130A, 130B of each strap 102A, 102B to enable adjustment of the shoulder strap ends 130A, 130B between a first configuration to accommodate a smaller child and a second configuration to accommodate a larger child. Likewise, the harness system 100 includes a lap strap adjuster associated with the lap strap ends 132A, 132B of each strap 102A, 102B to enable adjustment of the lap strap ends 132A, 132B between the first configuration and the second configuration to accommodate a larger child. The shoulder strap adjusters and lap strap adjusters will be explained in more detail below.

Figure 1A:
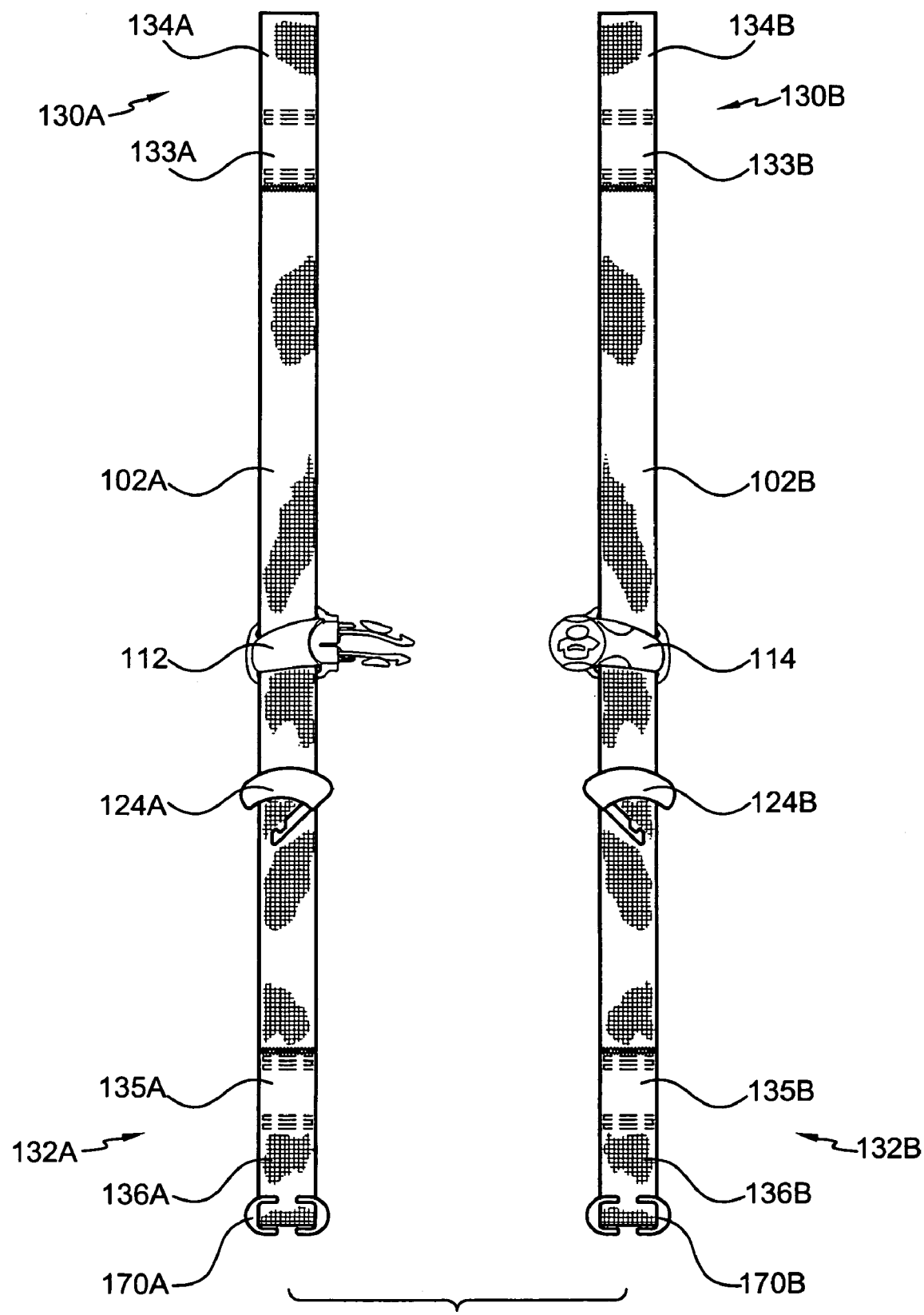
FIG. 1A is a top plan view of a harness system in accordance with the invention.

The remaining components of the harness system 100 will be explained with reference to FIGS. 1, 1A, and 2. FIG. 1A illustrates the two straps 102A, 102B. The harness system 100 can include a chest clip 110, a buckle assembly 120, and a harness adjuster strap 140. The chest clip 110 has a first member 112 slidably coupled to the shoulder strap area of the first strap 102A and a second member 114 slidably coupled to the shoulder strap area of the second strap 102B. The buckle assembly 120 generally includes a buckle 122, a crotch strap 126 coupled at one end to the carrier shell 12 and at the other end to the buckle 122, and first and second latches 124A, 124B. The first and second latches 124A, 124B are slidably coupled to the lap strap area of the first and second straps 102A, 102B, respectively. The latches 124A, 124B can releasably connect to the buckle 122. As seen in FIG. 1, the chest clip 110 is positionable at the child's armpit level, and the buckle assembly 120 is positionable between the child's thighs. The harness adjuster strap 140, which is visible at a front, lower edge of the infant carrier 10, can be pulled to tighten the straps 102A, 102B against a child seated in the infant carrier 10.

The first and second straps 102A, 102B each generally include a lap strap segment and a shoulder strap segment. The lap strap segment generally extends from the buckle 122, through the respective lap strap slot, to the lower surface 13 of the infant carrier 10. The shoulder strap segment generally extends from the buckle 122 through the respective shoulder strap slot, to the lower surface of the infant carrier 10. In the illustrated embodiment, the lap strap segment and the shoulder strap segment comprise a single, continuous strap, as seen in FIG. 1A. It is contemplated, however, that the lap strap segment and the shoulder strap segment can comprise two separate straps; that is, the first and second straps 102A, 102B, in an alternative embodiment, each can be formed by two separate straps, one representing the lap strap segment and the other representing the shoulder strap segment. Thus, each strap 102A, 102B can be formed as a single, continuous strap, as shown in FIG. 1A, or each can be formed as two separate straps joined at the buckle 130.

In addition to the components described above, which are generally visible on the upper surface of the infant carrier 10, the harness system 10 can include a junction clip 150, a harness cover 160, and first and second lap strap clips 170A, 170B at a lower surface 13 of the carrier 10, as seen in FIG. 2. The junction clip 150 can couple the shoulder strap ends 130A, 130B of the first and second straps 102A, 102B together and also can couple the harness strap 140 to the first and second straps 102A, 102B. When a caregiver pulls the harness strap 140 from a front edge of the carrier 10, the harness strap 140 pulls on the junction clip 150 at the lower surface of the carrier 10, which in turn pulls more length of the first and second straps 102A, 102B to the lower side of the carrier 10. In this manner, the harness strap 140 can tighten the harness system 100 against a child in the infant carrier 10. The first and second lap strap clips 170A, 170B can be coupled to the lap strap ends 132A, 132B of the first and second straps 102A, 102B. The harness cover 160 is centrally mounted to the lower surface 13 of the infant carrier 10. The harness cover 160 can be located generally between the lap strap slots 32A, 32B and can attach to a larger harness cover 161. The harness covers 160, 161 can function to retain the straps 102A, 102B in a centrally located region of the lower surface 13 of the infant carrier 10. The harness cover 160 also can function to prevent interference of the lap strap ends 132A, 132B with the shoulder strap ends 130A, 130B when the straps 102A, 102B are in the first configuration to accommodate a smaller child.

Figure 3:
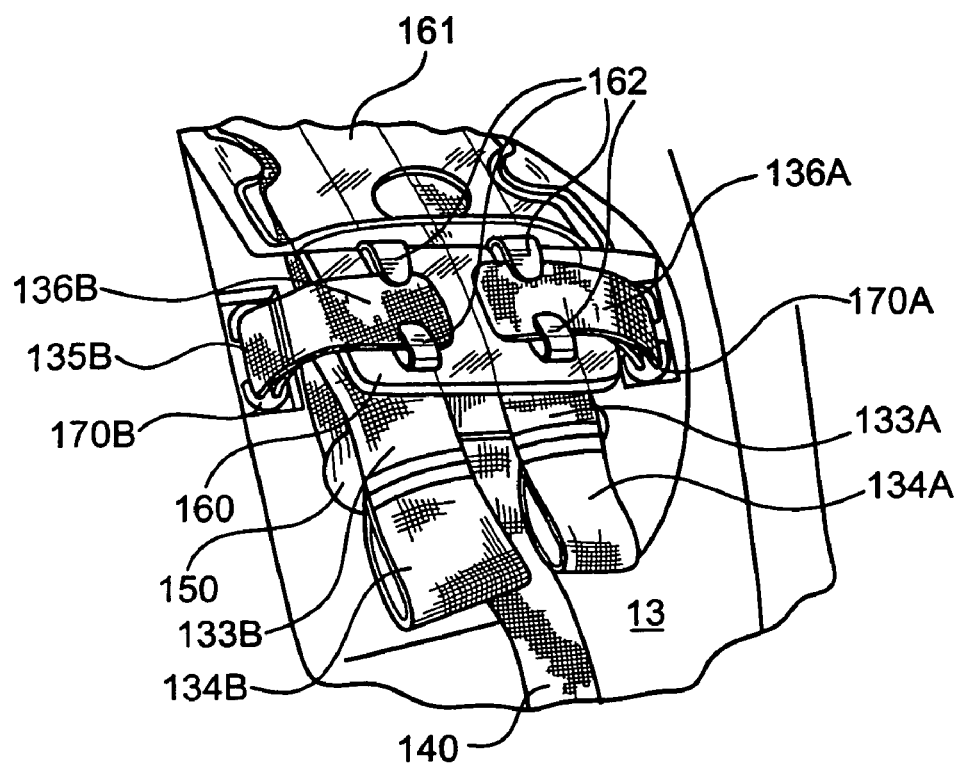
FIG. 3 is a detail perspective view of the shoulder strap ends and lap strap ends of the harness system in a first configuration suitable for a smaller child.
Figure 4:
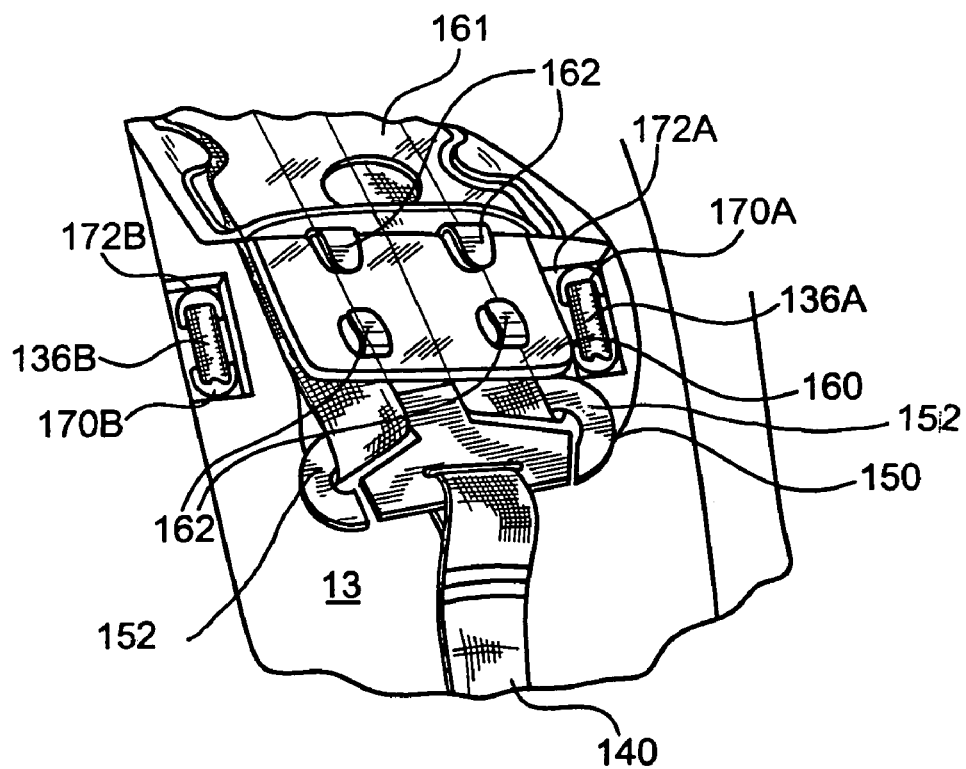
FIG. 4 is a detail perspective view of the shoulder strap ends and the lap strap ends of the harness system in a second configuration suitable for a larger child.

Adjustment of the harness system 100 between the first configuration suitable for a smaller child, as shown in FIG. 3, and the second configuration suitable for a larger child now, as shown in FIG. 4, will be described. As mentioned above, the harness system 100 includes a shoulder strap adjuster and a lap strap adjuster. The shoulder strap adjuster and the lap strap adjuster enable lengthening or shortening, as appropriate, of the operative (or available) strap length to secure a child in the infant carrier 10. A longer strap length is desirable when the child is large, and the straps must be threaded through shoulder strap slots 30A, 30B that are higher up the seat back 14. When the child is small, and the straps can be threaded through shoulder strap slots 30A, 30B that are lower on the seat back, the strap length can be shorter. Also, the larger the child, the longer the strap needs to be to account for the child's increased girth.

In one embodiment, the shoulder strap adjuster comprises first and second looped portions at the shoulder strap ends 130A, 130B and also arms of the junction clip 150 to which these looped portions can be attached. As can be seen in FIG. 1A, the shoulder strap end 130A of the first strap 102A has two looped portions 133A, 134A, and the shoulder strap end 130B of the second strap 102B has two looped portions 133B, 134B. Arms 152 of the junction clip 150 can be inserted in the first looped portions 133A, 133B of the first and second shoulder strap ends 130A, 130B in the first configuration to accommodate a smaller child (see FIG. 3), and arms 152 of the junction clip 150 can be inserted in the second looped portions 134A, 134B of the first and second shoulder strap ends 130A, 130B in the second configuration to accommodate a larger child (see FIG. 4).

Figure 7:
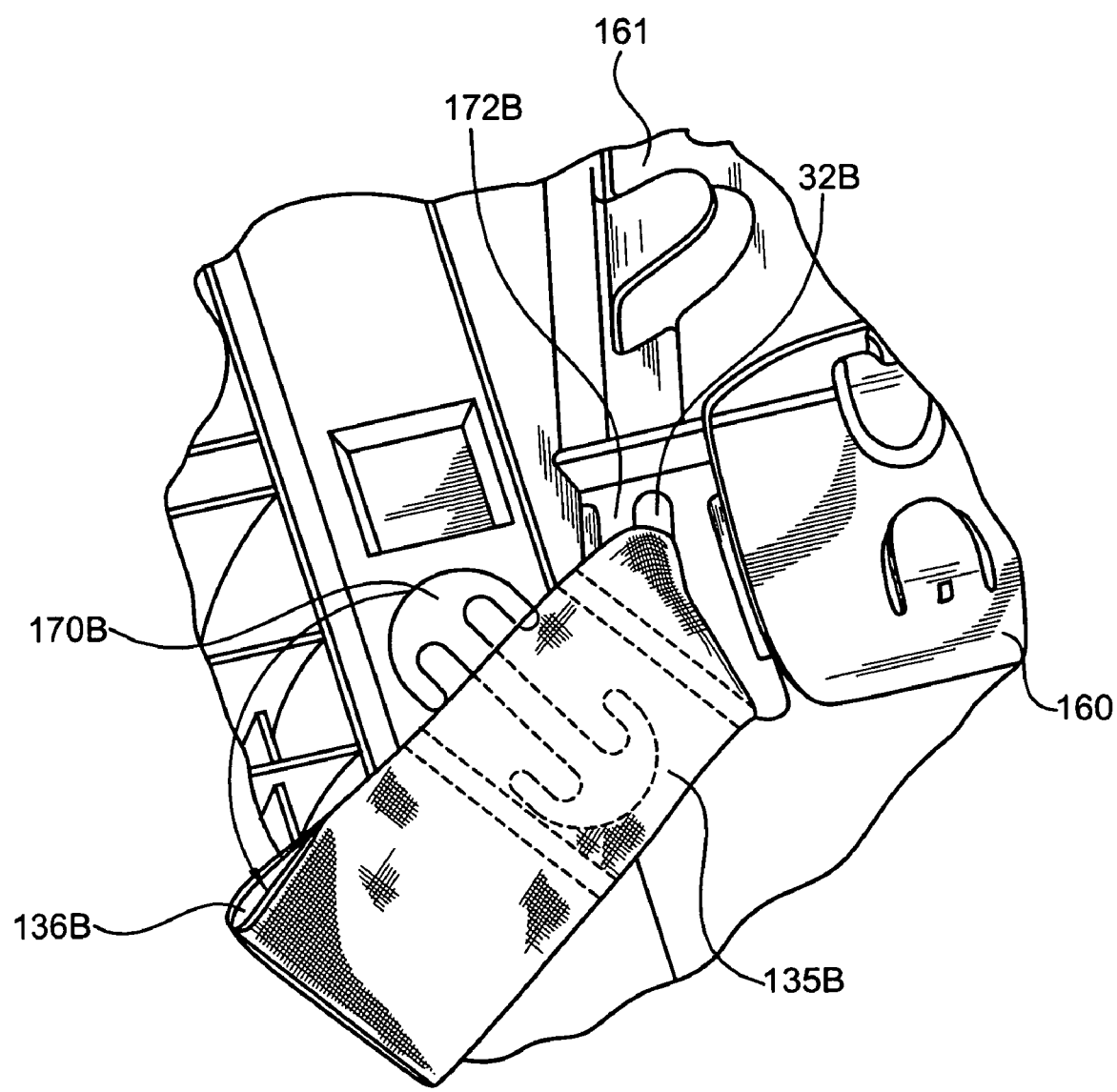
FIG. 7 is an enlarged view of a lap strap securement area of the infant carrier and illustrates first and second looped portions of the lap strap end and a lap strap clip suitable for securement to either of the loops.

In the embodiment of FIGS. 3 and 4, the lap strap adjuster comprises first and second looped portions at the lap strap ends 132A, 132B of the straps 102A, 102B and the first and second lap strap clips 170A, 170B. Similar to the shoulder strap ends 130A, 130B, the lap strap end 132A of the first strap 102A has two looped portions 135A, 136A, and the lap strap end 132B of the second strap 102B has two looped portions 135B, 136B. The first and second clips 170A, 170B can be inserted in the first looped portions 135A, 135B of the first and second lap strap ends 132A, 132B in the first configuration to accommodate a smaller child (see FIG. 3), and the clips 170A, 170B can be inserted in the second looped portions 136A, 136B of the first and second lap strap ends 132A, 132B in the second configuration to accommodate a larger child (see FIG. 4). FIG. 7 illustrates how lap strap clip 170B can be positioned in either looped portion 135B or in looped portion 136B in lap strap end 132B. The looped portions 133A, 133B and 134A, 134B and the looped portions 135A, 135B and 136A, 136B can be separated from each other by seam lines, as shown in FIGS. 1A and 7.

First looped portions 133A, 133B and 135A, 135B correspond to a shortened operative strap length, and second looped portions 134A, 134B and 136A, 136B correspond to a lengthened operative strap length. As can be seen by comparing FIGS. 3 and 4, when the junction clip 150 is positioned in the first looped portions 133A, 133B of the shoulder strap ends 130A, 130B, the operative (or available) strap length for securing a child to the infant carrier 10 is shorter than when the junction clip 150 is positioned in the second looped portions 134A, 134B. Similarly, when the clips 170A, 170B are positioned in the first looped portions 135A, 135B of the lap strap ends 132A, 132B, the operative (or available) strap length for securing a child to the infant carrier 10 is shorter than when the clips 170A, 170B are positioned in the second looped portions 136A, 136B.

It will be understood that the harness system 100 contemplates the first configuration for a smaller child, the second configuration for a larger child, and two additional, intermediate configurations. In a first intermediate configuration, the arms 152 of the junction clip 150 can be inserted in the first looped portions 133A, 133B of the first and second shoulder strap ends 130A, 130B, and the first and second clips 170A, 170B can be inserted in the second looped portions 136A, 136B of the first and second lap strap ends 132A, 132. In the second intermediate position, the arms 152 of the junction clip 150 can be inserted in the second looped portions 134A, 134B of the first and second shoulder strap ends 130A, 130B, and the first and second clips 170A, 170B can be inserted in the first looped portions 135A, 135B of the first and second lap strap ends 132A, 132. In addition, although each strap end 130A, 130B, 132A, 132B is described above as including two looped portions, it will be understood that the strap ends 130A, 130B, 132A, 132B can include more than two looped portions to provide longer operative (or available) strap lengths.

Figure 5:
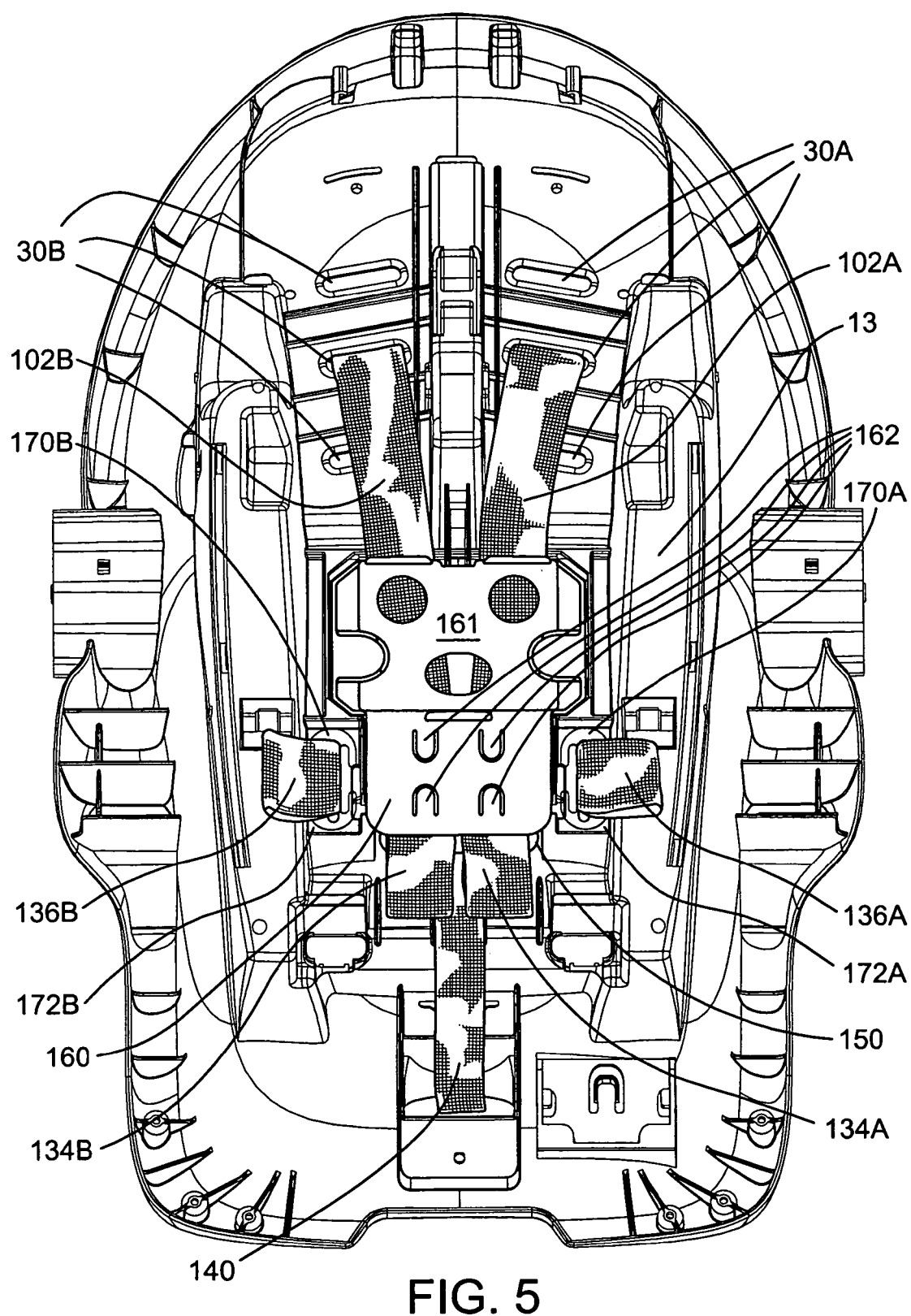
FIG. 5 is a bottom plan view of the infant carrier and the harness system with the lap strap ends removed from a harness cover in a first configuration suitable for a smaller child.
Figure 6:
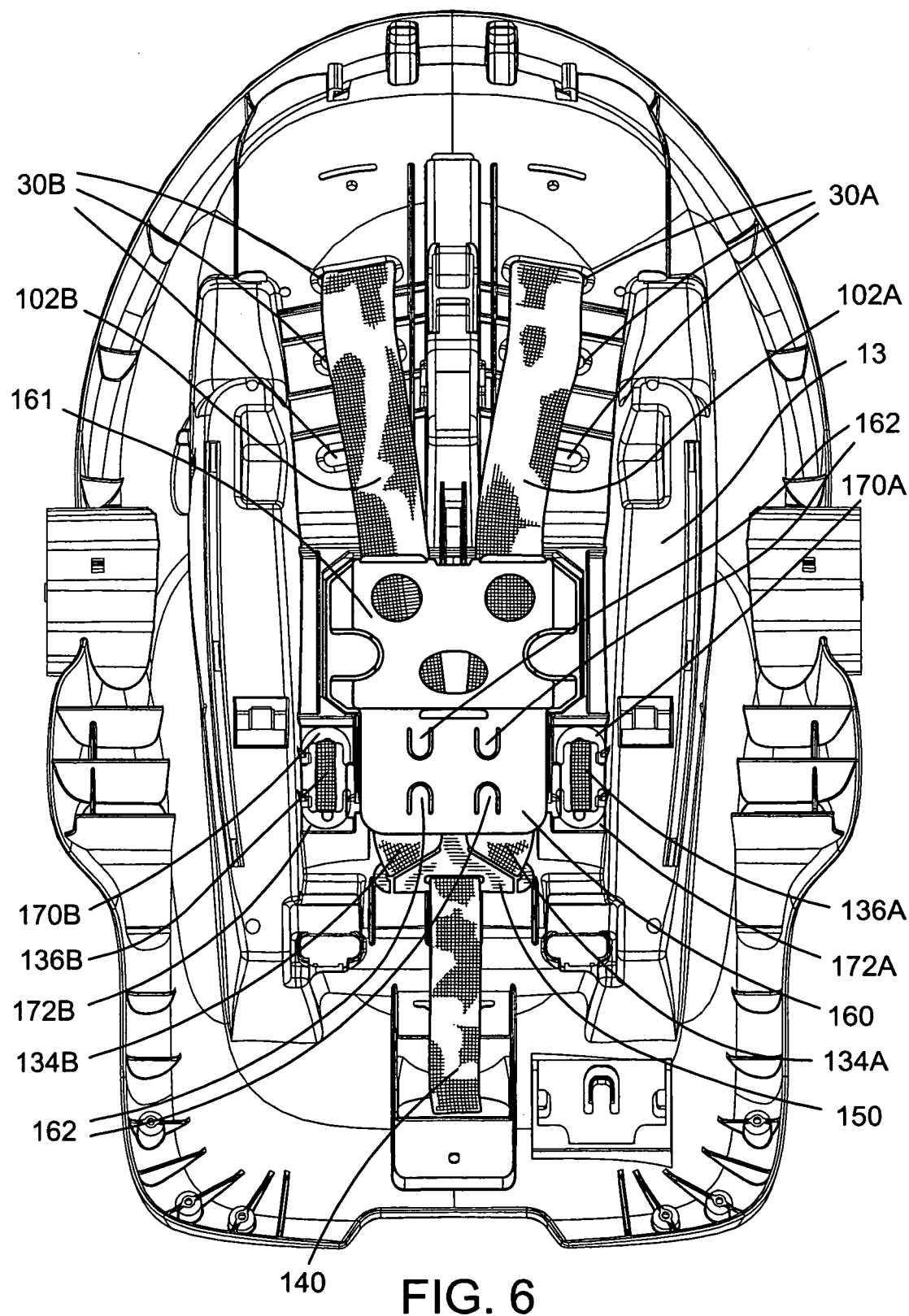
FIG. 6 is a bottom plan view of the infant carrier and the harness system in a second configuration suitable for a larger child.

FIG. 5 is a bottom plan view of the infant carrier 10 with the harness system 100 in the first configuration suitable for a smaller child. The lap strap ends 132A, 132B have been removed from the harness cover 160. FIG. 6 is a bottom plan view of the infant carrier 10 and the harness system 100 in the second configuration suitable for a larger child.

The first and second lap strap clips 170A, 170B can be held in cavities 172A, 172B formed on opposite sides of the lower surface 13 of the infant carrier 10. These cavities are shown best in FIG. 8. The cavities 172A, 172B can be aligned with lap strap slots 32A, 32B.

As can be seen in FIG. 3, when the first and second lap strap clips 170A, 170B are in the first looped portions 135A, 135B of lap strap ends 132A, 132B, the second looped portions 136A, 136B can be secured to the harness cover 160. In this regard, the harness cover 160 can include tabs 162 between which the second looped portions 136A, 136B can be secured. FIG. 3 shows the location of the tabs 162 in one embodiment of the harness cover 160. The tabs 162 are arranged in two pairs, one tab opposite another, to secure therebetween the respective second looped portion 136A, 136B of the lap strap ends 132A, 132B. Securement of the looped portions 136A, 136B between the tabs 162 ensures that the looped portions 136A, 136B will not interfere with the connection of the shoulder strap ends 130A, 130B to the junction clip 150. As an alternative to tabs 162, the harness cover 160 or the carrier shell 12 can include clips, hooks, slots, or other securement structures to secure the second looped portions 136A, 136B of the lap strap ends 132A, 132B.

Figure 9:
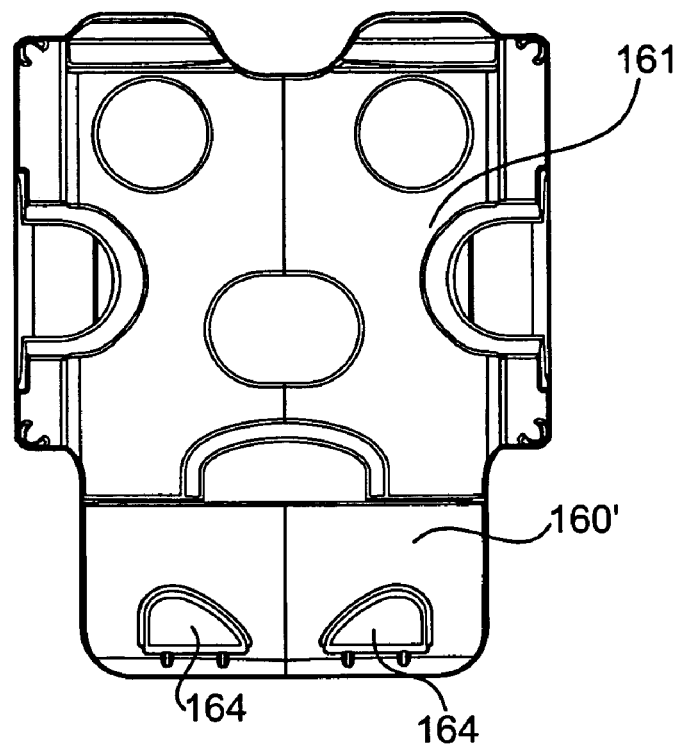
FIG. 9 is a front plan view of an alternative harness cover.
Figure 10:
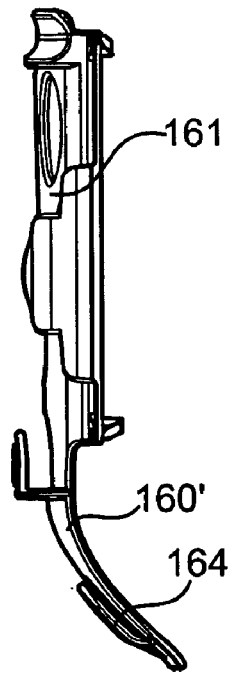
FIG. 10 is a side elevation view of the harness cover of FIG. 9.

FIGS. 9 and 10 illustrate an alternative harness cover 160' suitable for use in the present invention. Rather than four tabs, as present on harness cover 160, the harness cover 160' has one tab 164 per side, or one tab per looped portion 136A, 136B. Like tabs 162, tabs 164 are placed to ensure that looped portions 136A, 136B will not interfere with the connection of the shoulder strap ends 130A, 130B to the junction clip 150.

Figure 11:
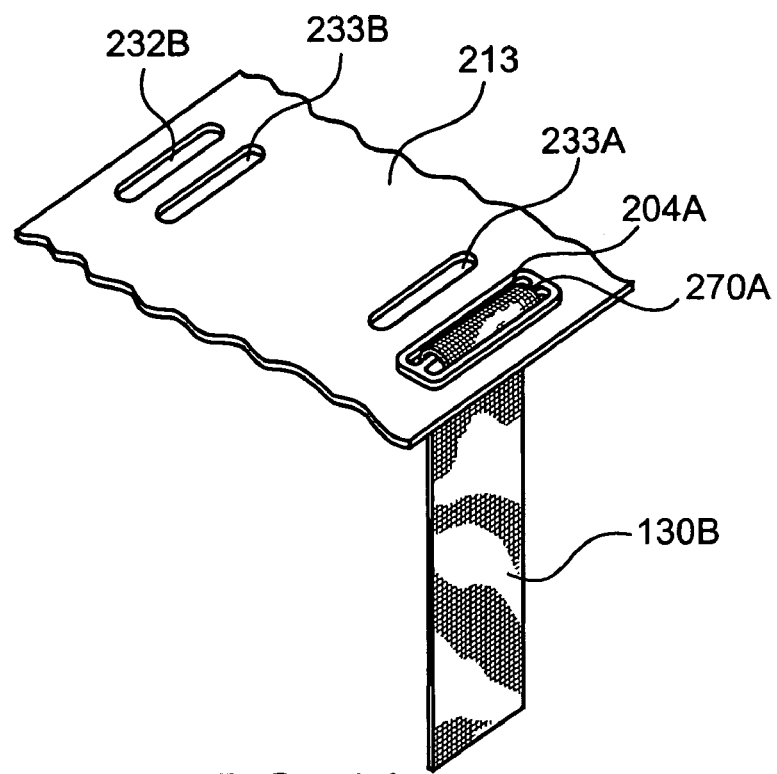
Figure 12:
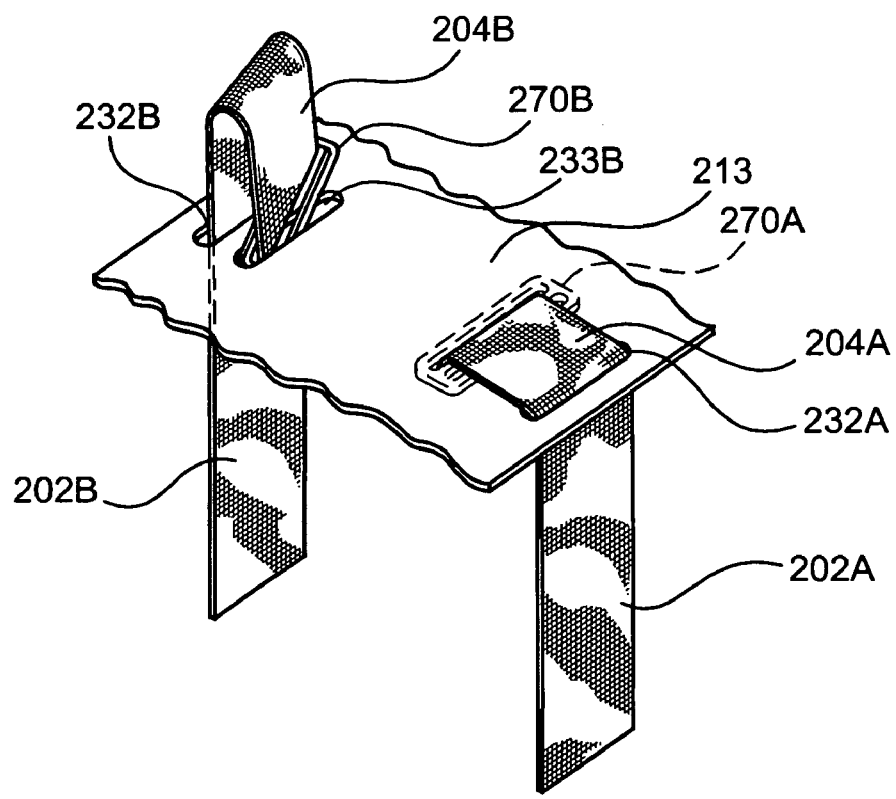

FIGS. 11 and 12 illustrate an alternative lap strap adjuster. FIG. 12 illustrates lap strap ends in a first configuration suitable for a smaller child, and FIG. 11 illustrates a lap strap end in a second configuration suitable for a larger child. In this embodiment, a lap strap clip 270A, 270B is attached to the lap strap ends 204A, 204B of respective straps 202A, 202B. The lap strap adjuster of the lap strap ends 204A, 204B includes the lap strap clips 270A, 270B and an adjuster slot 233A, 233B through the carrier shell, adjacent a respective lap strap slot 232A, 232B. As can be seen in FIG. 12, in the first configuration for a smaller child, requiring less strap length, the lap strap ends 204A, 204B can be threaded through both the respective lap strap slots 232A, 232B and the respective adjuster slots 233A, 233B. The lap strap ends 204A, 204B then can be secured to the respective adjuster slots 233A, 233B by the lap strap clips 270A, 270B. With the clips 270A, 270B positioned through the adjuster slots 233A, 233B, the straps 202A, 202B are shorter for a smaller child. In the second configuration for a larger child, requiring more strap length, the lap strap ends 204A, 204B can be threaded through the respective lap strap slots 232A, 232B only and secured at the respective lap strap slots 232A, 232B by the lap strap clips 270A, 270B. With the clips 270A, 270B positioned through the lap strap slots 232A, 232B only, the straps 202A, 202B are longer for a larger child.

The preferred embodiments have been set forth herein for the purpose of illustration. This description, however, should not be deemed to be a limitation on the scope of the invention. Various modifications, adaptations, and alternatives may occur to one skilled in the art without departing from the claimed inventive concept. The true scope and spirit of the invention are indicated by the following claims.

What is claimed is:

1. An infant carrier, comprising:
a carrier shell including a first set of shoulder strap slots, a second set of corresponding shoulder strap slots laterally spaced from the first set of shoulder strap slots, and first and second lap strap slots; and
a harness system connected to the carrier shell and reconfigurable between a first configuration for a smaller child and a second configuration for a larger child, the harness system including
a first strap threaded through a selected one of the shoulder strap slots and through the first lap strap slot;
a second strap threaded through a selected one of the corresponding shoulder strap slots and through the second lap strap slot, wherein each of the first and second straps includes a shoulder strap end having first and second looped portions and a lap strap end having first and second looped portions,
a junction clip to couple the first and second straps together, the junction clip either received in the first looped portions of the first and second shoulder strap ends in the first configuration, or the junction clip received in the second looped portions of the first and second shoulder strap ends in the second configuration,
a first lap strap clip either received in the first looped portion of the first lap strap in the first configuration or received in the second looped portion of the first lap strap in the second configuration, and
a second lap strap clip either received in the first looped portion of the second lap strap in the first configuration or received in the second looped portion of the second lap strap in the second configuration.

2. The infant carrier of claim 1, wherein the first and second straps each include a lap strap segment and a shoulder strap segment.

3. The infant carrier of claim 2, wherein the lap strap segment and the shoulder strap segment comprise a single, continuous strap.

4. The infant carrier of claim 2, wherein the lap strap segment and the shoulder strap segment comprise two separate straps.

5. The infant carrier of claim 1, wherein the harness system includes a harness adjuster strap, and the junction clip is adapted to couple the first and second straps to the harness adjuster strap.

6. An infant carrier, comprising:
a carrier shell including a seating area for a child; and
a harness system connected to the carrier shell and reconfigurable between a first configuration for a smaller child and a second configuration for a larger child, the harness system including first and second straps, each of the first and second straps having a shoulder strap end and a lap strap end, a shoulder strap adjuster associated with the shoulder strap ends of each of the first and second straps to enable adjustment of the shoulder strap ends between the first configuration and the second configuration, and a lap strap adjuster associated with the lap strap ends of each of the first and second straps to enable adjustment of the lap strap ends between the first configuration and the second configuration, wherein the lap strap adjuster includes a first and second connection associated with the lap strap ends, wherein either the first connection is attached to the carrier shell such that the lap strap ends are in the first configuration, or the second connection is attached to the carrier shell such that the lap strap ends are in the second configuration, and wherein each of the first and second straps has a shorter maximum available length in the first configuration and a longer maximum available length in the second configuration that is greater than the shorter maximum available length, each maximum available length defined in part by adjustment of the lap strap adjuster.

7. The infant carrier of claim 6, wherein the first and second straps each include a lap strap segment and a shoulder strap segment.

8. The infant carrier of claim 7, wherein the lap strap segment and the shoulder strap segment comprise two separate straps.

9. The infant carrier of claim 7, wherein the harness system includes a chest clip having a first member slidably coupled to the shoulder strap segment of the first strap and a second member slidably coupled to the shoulder strap segment of the second strap.

10. The infant carrier of claim 7, wherein the harness system includes a crotch strap and a buckle coupled to the crotch strap.

11. The infant carrier of claim 6, wherein the first and second connections comprise first and second looped portions at the respective lap strap end, and wherein the lap strap adjuster of each of the lap strap ends comprises a lap strap clip either received in the first looped portion in the first configuration or received in the second looped portion in the second configuration.

12. The infant carrier of claim 11, wherein the carrier shell includes a pair of cavities to receive the respective lap strap clips.

13. An infant carrier, comprising:

a carrier shell including a seating area for a child; and a harness system connected to the carrier shell and reconfigurable between a first configuration for a smaller child and a second configuration for a larger child, the harness system including first and second straps, each of the first and second straps including a lap strap segment and a shoulder strap segment having a shoulder strap end and a lap strap end, wherein the lap strap segment and the shoulder strap segment comprise a single, continuous strap, a shoulder strap adjuster associated with the shoulder strap ends of each of the first and second straps to enable adjustment of the shoulder strap ends between the first configuration and the second configuration, and a lap strap adjuster associated with the lap strap ends of each of the first and second straps to enable adjustment of the lap strap ends between the first configuration and the second configuration, wherein each of the first and second straps has a shorted maximum available length in the first configuration and a longer maximum available length in the second configuration that is greater than the shorter maximum available length, each maximum available length defined in part by adjustment of the lap strap adjuster.

14. An infant carrier, comprising:

a carrier shell including a seating area for a child: and a harness system connected to the carrier shell and reconfigurable between a first configuration for a smaller child and a second configuration for a larger child, the harness system including first and second straps, each of the first and second straps including a lap strap segment having a lap strap end and a shoulder strap segment having a shoulder strap end, a shoulder strap adjuster associated with the shoulder strap ends of each of the first and second straps to enable adjustment of the shoulder strap ends between the first configuration and the second configuration, a crotch strap and a buckle coupled to the crotch strap, a lap strap adjuster associated with the lap strap ends of each of the first and second straps to enable adjustment of the lap strap ends between the first configuration and the second configuration, and a first latch slidably coupled to the lap strap segment of the first strap and a second latch slidably coupled to the lap strap segment of the second strap, wherein the first and second latches releasably connect to the buckle, wherein each of the first and second straps has a shorted maximum available length in the first configuration and a longer maximum available length in the second configuration that is greater than the shorter maximum available length, each maximum available length defined in part by adjustment of the lap strap adjuster.

15. An infant carrier, comprising:

a carrier shell including a seating area for a child, wherein the carrier shell includes first and second lap strap slots; and a harness system connected to the carrier shell and reconfigurable between a first configuration for a smaller child and a second configuration for a larger child, the harness system including first and second straps, each of the first and second straps having a shoulder strap end and a lap strap end, wherein the first strap is threaded through the first lap strap slot, and the second strap is threaded through the second lap strap slot such that the lap strap ends of the first and second straps are located at a lower surface of the infant carrier;

a shoulder strap adjuster associated with the shoulder strap ends of each of the first and second straps to enable adjustment of the shoulder strap ends between the first configuration and the second configuration, and a lap strap adjuster associated with the lap strap ends of each of the first and second straps to enable adjustment of the lap strap ends between the first configuration and the second configuration, wherein each of the first and second straps has a shorted maximum available length in the first configuration and a longer maximum available length in the second configuration that is greater than the shorter maximum available length, each maximum available length defined in part by adjustment of the lap strap adjuster.

16. The infant carrier of claim 15, wherein the lap strap adjuster of each of the lap strap ends comprises first and second looped portions on each respective lap strap end, and a lap strap clip either received in the first looped portion in the first configuration or received in the second looped portion in the second configuration.

17. The infant carrier of claim 16, wherein the carrier shell includes first and second cavities to receive the respective lap strap clips.

18. The infant carrier of claim 17, wherein the first and second cavities are formed on opposite sides of the lower surface of the carrier shell.

19. The infant carrier of claim 17, wherein the first and second cavities are aligned with the first and second lap strap slots, respectively.

20. The infant carrier of claim 16, wherein the first and second looped portions correspond to the shorter maximum available length in the first configuration and the longer maximum available length in the second configuration, respectively.

21. The infant carrier of claim 16, wherein the harness system includes a harness cover mounted to the lower surface of the infant carrier to secure the second looped portions of the first and second lap strap ends when the first and second lap strap clips are received in the first loped portions of the first and second lap strap ends, respectively.

22. The infant carrier of claim 16, wherein the harness system includes a harness cover mounted to a lower surface of the infant carrier, the harness cover having tabs securing the lap strap ends of the first and second straps to the harness cover.

23. The infant carrier of claim 15, wherein the lap strap adjuster of the lap strap end of each of the first and second straps comprises a lap strap clip and an adjuster slot in the carrier shell adjacent a respective one of the first and second lap strap slots, wherein the lap strap end of each strap is either threaded through both the respective lap strap slot and the respective adjuster slot and secured at the respective adjuster slot by the lap strap clip in the first configuration or the lap strap end of each strap can be threaded through the respective lap strap slot only and secured at the respective lap strap slot by the lap strap clip in the second configuration.

24. An infant carrier, comprising:
a carrier shell including a seating area for a child; and
a harness system connected to the carrier shell and reconfigurable between a first configuration for a smaller child and a second configuration for a larger child, the harness system including
first and second straps, each of the first and second straps having a shoulder strap end and a lap strap end,
a shoulder strap adjuster associated with the shoulder strap ends of each of the first and second straps to enable adjustment of the shoulder strap ends between the first configuration and the second configuration, wherein the shoulder strap adjuster includes a junction clip and first and second looped portions on each of the shoulder strap ends wherein the junction clip couples the first and second shoulder strap ends of the first and second straps together and
a lap strap adjuster associated with the lap strap ends of each of the first and second straps to enable adjustment of the lap strap ends between the first configuration and the second configuration, wherein
each of the first and second straps has a shorted maximum available length in the first configuration and a longer maximum available length in the second configuration that is greater than the shorter maximum available length, each maximum available length defined in part by adjustment of the lap strap adjuster.

25. The infant car seat of claim 24, wherein arms of the junction clip are either received in the first looped portions of the shoulder strap ends in the first configuration or received in the second looped portions of the shoulder strap ends in the second configuration.

26. The infant carrier of claim 24, wherein the carrier shell includes a first set of shoulder strap slots and a second set of corresponding shoulder strap slots, wherein the first strap threaded through a selected one of the shoulder strap slots, and the second strap is threaded through a selected one of the corresponding shoulder strap slots.

27. The infant carrier of claim 24, wherein the harness system includes a harness adjuster strap, and the junction clip couples the first and second straps to the harness adjuster strap.

28. An infant carrier, comprising:
a carrier shell including first and second lap strap slots; and
a harness system adapted to be connected to the carrier shell and reconfigurable between a first configuration for a smaller child and a second configuration for a larger child, the harness system including
a first strap threaded through the first lap strap slot,
a second strap threaded through the second lap strap slot, wherein each of the first and second straps includes a lap strap end having first and second looped portions
a first lap strap clip either received in the first looped portion of the first lap strap end in the first configuration or received in the second looped portion of the first lap strap in the second configuration; and
a second lap strap clip either received the first looped portion of the second lap strap in the first configuration or received in the second looped portion of the second lap strap in the second configuration.

29. The infant carrier of claim 28, wherein the carrier shell includes a pair of cavities to hold the respective lap strap clips associated with the lap strap ends of the first and second straps.

30. The infant carrier of claim 29, wherein the carrier shell includes a lower surface, and the cavities are formed on opposite sides of the lower surface of the carrier shell.

31. The infant carrier of claim 30, wherein the carrier shell includes first and second lap strap slots to receive the first and second straps, respectively, and the cavities each are aligned with the respective lap strap slot.

32. The infant carrier of claim 28, wherein the carrier shell includes first and second lap strap slots, wherein the first strap is threaded through the first lap strap slot, and the second strap is threaded through the second lap strap slot such that the lap strap ends of the first and second straps are located at a lower surface of the infant carrier.

33. The infant carrier of claim 32, wherein the first and second looped portions correspond to a shortened operative length and a lengthened operative length, respectively.

34. The infant carrier of claim 33, wherein the harness system includes a harness cover mounted to a lower surface of the infant carrier to secure the second looped portions of the first and second lap strap ends when the first and second lap strap clips are received in the first looped portions of the first and second lap strap ends.

35. The infant carrier of claim 28, wherein the harness system includes a harness cover mounted to a lower surface of the infant carrier, the harness cover having tabs to secure the lap strap ends of the first and second straps to the harness cover.

36. An infant carrier, comprising
a carrier shell including first and second lap strap slots and first and second adjuster slots; and
a harness system connected to the carrier shell and reconfigurable between a first configuration for a smaller child and a second configuration fort a larger child, the harness system including
a first strap having a first lap strap end,
a second strap having a second lap strap end, and
first and second lap strap clips associated with the first and second lap strap ends, respectively,
wherein the first and second lap strap ends are either threaded through both the respective lap strap slot and the respective adjuster slot and secured at the respective adjuster slot by the respective lap strap clip in the first configuration or the first and second lap strap ends can be threaded through the respective lap strap slot only and secured at the respective lap strap slot by the respective lap strap clip in the second configuration.

* * * * *

UNITED STATES PATENT AND TRADEMARK OFFICE
CERTIFICATE OF CORRECTION

| | | |
|---|---|---|
| PATENT NO. | : 7,188,897 B2 | Page 1 of 1 |
| APPLICATION NO. | : 11/079516 | |
| DATED | : March 13, 2007 | |
| INVENTOR(S) | : Patrizi et al. | |

It is certified that error appears in the above-identified patent and that said Letters Patent is hereby corrected as shown below:

In the claims:
Column 12, claim 28, line 40, insert --in -- after "received"

Signed and Sealed this

Twenty-second Day of May, 2007

JON W. DUDAS
*Director of the United States Patent and Trademark Office*